United States Patent [19]

Hashimoto et al.

[11] Patent Number: 4,549,227
[45] Date of Patent: Oct. 22, 1985

[54] METHOD AND APPARATUS FOR RECORDING A DIGITAL INFORMATION SIGNAL IN PARALLEL TRACKS ON A RECORD MEDIUM WITHOUT GUARD BANDS BETWEEN AT LEAST SOME ADJACENT TRACKS

[75] Inventors: Yoshitaka Hashimoto, Chofu; Takeo Eguchi, Hatano, both of Japan

[73] Assignee: Sony Corporation, Tokyo, Japan

[21] Appl. No.: 211,280

[22] Filed: Nov. 28, 1980

[30] Foreign Application Priority Data

Nov. 28, 1979 [JP] Japan .................. 54-154116

[51] Int. Cl.[4] .................. H04N 9/491; H04N 9/44; H04N 5/78
[52] U.S. Cl. .................. 358/328; 358/320; 358/310; 360/32; 360/36.2
[58] Field of Search .................. 358/4, 127, 128.6, 13, 358/310, 327, 328; 360/22, 32, 39, 40; 364/514, 515

[56] References Cited

U.S. PATENT DOCUMENTS

| | | | |
|---|---|---|---|
| 3,812,523 | 5/1974 | Narahara | 358/328 |
| 3,921,132 | 11/1975 | Baldwin | 360/32 X |
| 3,925,816 | 12/1975 | Kihara | 358/328 |
| 4,167,759 | 9/1979 | Tachi | 360/72.2 X |
| 4,233,621 | 11/1980 | Yamagiwa et al. | 358/4 X |
| 4,277,807 | 7/1981 | Baldwin | 360/32 |

OTHER PUBLICATIONS

NHK Laboratories Nove. Ser. No. 221, Dec. 1977; Yokoyama et al., "PCM Video Recording Using a Rotating Magnetic Sheet".
"Digital Television at Reduced Bit Rates", Connor, SMPTE Journal, vol. 86, Nov. 1977.
"Digital Television Recording with Low Tape Consumption", Baldwin, IEE Conference Pub. No. 166, pp. 133–136, 1978.
"An Experimental Digital Videotape Recorder"; Yokoyama et al., SMPTE Journal, vol. 89, No. 3, Mar. 1980.
"Digital Video Recording-Some Experiments and Future Considerations"; Morizono et al., SMPTE Journal, vol. 89, No. 9, Sep. 1980.

*Primary Examiner*—Aristotelis M. Psitos
*Attorney, Agent, or Firm*—Lewis H. Eslinger; Alvin Sinderbrand

[57] ABSTRACT

Apparatus for performing a method of recording a color video signal on a magnetic tape includes an analog-to-digital converter which samples the video signal at a frequency which is at least three times the color subcarrier frequency of the color video signal and converts the sampled color video signal to digital form; an interface which sequentially distributes the digitized samples to, for example, four channels, each channel including a time base compressor for compressing the digitized samples supplied thereto, an error control encoder for generating error control data from the respective compressed samples and adding the error control data thereto, and a recording processor for adding synchronizing, identifying and address signals to the compressed digitized samples supplied thereto and for code converting the digitized video signal in the form of 8-bit words to a respective 10-bit word code to reduce the low frequency components of the digitized video signal; and four recording transducers, each associated with one of the channels, for recording the digitized video signal from the four channels in a plurality of parallel tracks extending obliquely on the magnetic tape without guard bands between, preferably, any adjacent ones of the tracks and with the digitized video signal being recorded in alternate ones of the tracks with a first azimuth angle and the digitized video signal being recorded in the remaining alternate ones of the tracks with a second azimuth angle which is different from the first azimuth angle.

16 Claims, 19 Drawing Figures

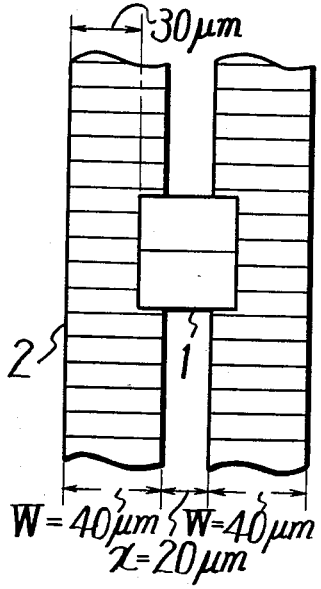
FIG. 3B
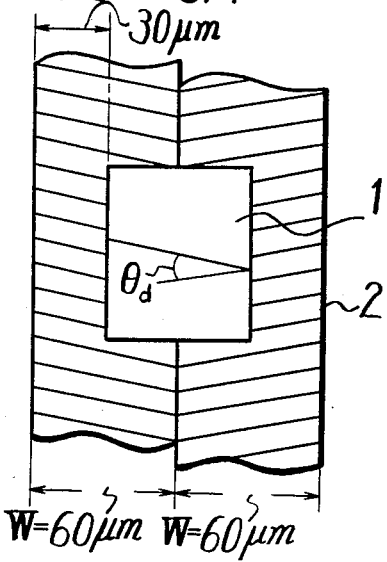
FIG. 3A
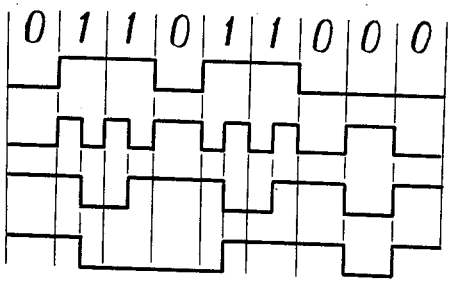
FIG. 4A NRZ
FIG. 4B BI-PHASE
FIG. 4C M
FIG. 4D M²
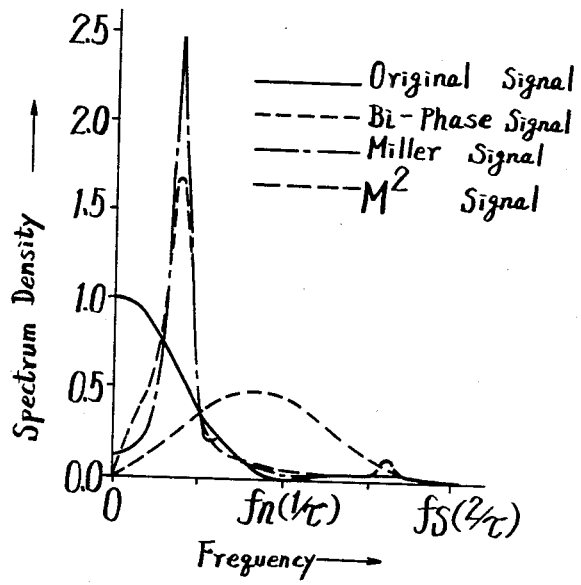
FIG. 5
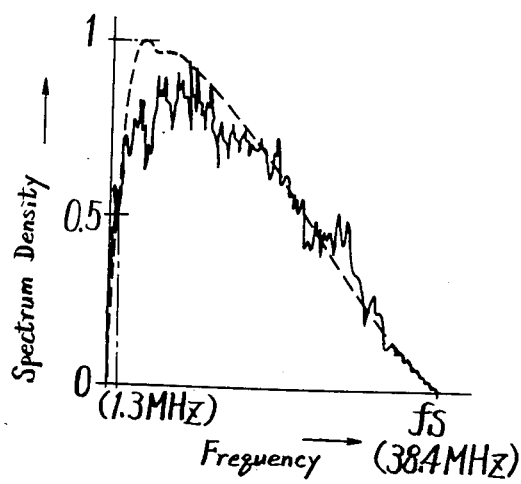
FIG. 6

METHOD AND APPARATUS FOR RECORDING A DIGITAL INFORMATION SIGNAL IN PARALLEL TRACKS ON A RECORD MEDIUM WITHOUT GUARD BANDS BETWEEN AT LEAST SOME ADJACENT TRACKS

BACKGROUND OF THE INVENTION

This invention relates generally to a method and apparatus for recording a digitized video signal on a magnetic tape and, more particularly, is directed to a method and apparatus for recording a digitized video signal on a magnetic tape with a high recording density.

Conventionally, apparatus for recording a video signal on a magnetic tape have been of the analog, rather than digital, type. However, there has been a recent turn towards development of digital video tape recorders (VTR). Digital VTRs have a very high picture quality, which enables multiple generation dubbing with virtually no picture impairment. Further, digital VTRs provide adjustment free circuits and self-diagnostic systems which enable easier maintenance and higher reliability.

With digital VTRs, an analog video signal is converted into digital form by an A/D (analog-to-digital) converter. In particular, the analog video signal is sampled by clock pulses having a sampling frequency which may be, for example, $4f_{sc}$, where $f_{sc}$ is the color sub-carrier frequency of the color video signal, resulting in the analog video signal being converted into a digitized video signal comprised of 8-bit words. The digitized signal is also coded by an error control encoder so that errors may be corrected and concealed on playback and, it is further coded by a channel encoder to achieve high density digital recording. The coded digitized signal is then recorded on a magnetic tape by means of a recording amplifier. However, it should be appreciated from the above that the recording bit rate, that is, the rate of occurrence of each bit of the digitized video signal, is extremely high. For example, in the above-described embodiment, where the color sub-carrier frequency $f_{sc} = 3.58$ MHz, the recording bit rate is equal to $4f_{sc}$ times the number of bits per word. In other words, the recording bit rate is obtained as follows:

Bit rate $= 4 \times 3.58 \times 10^6 \times 8 = 114.6$ Mb/s.

Because of such high recording bit rate, the digitized video signal is not suitable for recording in a single recording channel.

Accordingly, it has been proposed to separate the digitized video signal into at least two separate channels prior to recording it on a magnetic tape so as to reduce the recording bit rate per channel. Typically, a magnetic head is associated with each channel and all of the magnetic heads are aligned to record the respective channels on a magnetic tape in parallel tracks extending obliquely on the tape. In order to separate the digitized video signal into, for example, two channels, an interface is provided which distributes alternate 8-bit words of the digitized video signal into the respective channels.

In recording the digitized video signal in the parallel tracks, it is desirable to increase the signal-to-noise (S/N) ratio so that, during reproduction, a video picture of high quality can be obtained, while at the same time, reducing the amount of tape consumption by recording the digitized signal with a high density. It should be appreciated that these two objections are contrary to one another. For example, as the track width is decreased so as to obtain such high density recording, the S/N ratio of the video signal reproduced from the tracks deteriorates. In like manner, as the track width is increased which results in higher tape consumption, the S/N ratio increases.

Therefore, in such previously proposed apparatus, guard bands have been provided between adjacent ones of the parallel tracks recorded on the magnetic tape so as to avoid cross-talk interference between such adjacent tracks, resulting in a higher S/N ratio. However, when the track width is 40 $\mu$m, for example, the width of the guard band between each of the adjacent tracks must be at least 20 $\mu$m, resulting in a high tape consumption. If, on the contrary, the track width is made narrower, tracking errors are apt to occur during the reproduction operation, wherein the heads do not accurately trace the recorded tracks, resulting in a deterioration of the S/N ratio. Also, with a reduction of track width, there necessarily is a reduction in the width of the guard bands, resulting in increased cross-talk interference (noise) from adjacent tracks.

OBJECTS AND SUMMARY OF THE INVENTION

Accordingly, it is an object of this invention to provide a method and apparatus for recording a digitized video signal on a magnetic tape that avoids the above-described difficulties encountered with the prior art.

It is another object of this invention to provide a method and apparatus for recording a digitized video signal in which the digitized video signal is sequentially distributed to a plurality of channels and then the digitized video signal in each channel is recorded in a plurality of parallel tracks extending obliquely on a magnetic tape without guard bands between adjacent tracks.

It is still another object of this invention to provide a method and apparatus for recording a digitized video signal in which the video signal, upon being reproduced, has a high signal-to-noise (S/N) ratio.

It is yet another object of this invention to provide a method and apparatus for recording a digitized video signal in which the digitized video signal is recorded with a high recording density in a plurality of parallel tracks extending obliquely on a magnetic tape so as to reduce tape consumption.

It is a further object of this invention to provide a method and apparatus for recording a digitized video signal in which the digitized video signal is recorded in a plurality of parallel tracks extending obliquely on a magnetic tape and having a guard band between adjacent tracks, with the digitized video signal in at least some of the tracks being recorded with an azimuth angle which is different from other ones of the tracks.

In accordance with an aspect of this invention, apparatus for recording a video signal on a magnetic tape includes means for converting the video signal into digital form; means for distributing respective portions of the digitized video signal to at least two channels; and means for recording the respective portions of the digitized video signal in a plurality of parallel tracks extending obliquely on the magnetic tape without guard bands between at least some adjacent ones of the parallel tracks and with the portions of the digitized video signal in some of the parallel tracks being recorded with an azimuth angle which is different from the azimuth angle in other ones of the parallel tracks.

In accordance with another aspect of this invention, a method of recording a video signal on a magnetic tape includes the steps of converting the video signal into digital form; distributing respective portions of the digitized video signal to at least two channels; and recording the respective portions of the digitized video signal in a plurality of parallel tracks extending obliquely on the magnetic tape without guard bands between at least some adjacent ones of the parallel tracks and with the portions of the digitized video signal in some of the parallel tracks being recorded with an azimuth angle which is different from the azimuth angle in other ones of the parallel tracks.

In accordance with a further aspect of this invention, the digital video signal, prior to recording, is code converted, for example, by an 8-to-10 code conversion system, in order to reduce low frequency spectrum components of the digitized video signal so as to improve the S/N ratio of the video signal when reproduced.

The above, and other, objects, features and advantages of the present invention, will be apparent from the following detailed description which is to be read in connection with the accompanying drawings.

BRIEF DESCRIPTION OF THE DRAWINGS

FIGS. 3A and 3B are schematic diagrams illustrating the tracking by a magnetic head with apparatus according to this invention and with previously proposed apparatus for recording a digitized video signal;

FIGS. 4A-4D are waveform diagrams of various digital code converting formats;

FIG. 5 is a graphical diagram of the frequency spectrum density for the various formats shown in FIGS. 4A-4D;

FIG. 6 is a graphical diagram of the frequency spectrum density illustrating the reduction of low frequency components by means of an 8-to-10 code conversion system;

DETAILED DESCRIPTION OF THE PREFERRED EMBODIMENTS

Figure 1:
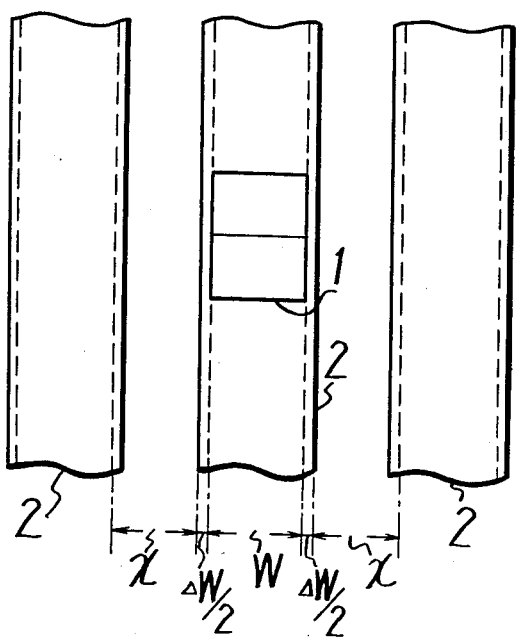
FIG. 1 is a schematic diagram used for explaining the recording of a digitized video signal in parallel tracks with guard bands between adjacent tracks, according to a previously proposed method of recording a digitized video signal.

In order to facilitate a better understanding of the present invention, there will first be described the conditions for digital recording of a color video signal with a high signal-to-noise (S/N) ratio and a high recording density.

Where a digitized video signal is transmitted, a tolerable bit error rate in the transmission of the digitized signal is $1 \times 10^{-7}$. Since the S/N ratio of a transmission path (where the signal is measured by its peak-to-peak value and the noise is measured by an effective value) is more than 20 dB when the bit error rate is slightly less than $1 \times 10^{-7}$, the S/N ratio of a digitized color video signal obtained, during reproduction from a digital VTR, must be larger than 20 dB.

In addition to the requirement for a sufficiently high S/N ratio, it is also desirable to reduce the tape consumption so as to obtain maximum utilization of the magnetic tape. This, of course, means that the digital video signal must be recorded with a high bit density. In order to obtain such high bit density recording, the number of recorded bits per unit area of tape S (recording bit density) must be high, in which the recording bit density S is expressed by the following equation:

$$S = L \cdot T \tag{1}$$

where L is the line bit density, that is, the number of recorded bits per unit length in the lengthwise direction of the track, and T is the track density, that is, the number of recorded bits per unit length in the widthwise direction of the track. Generally, as the value of the line bit density L increases, a short wavelength for recording must be utilized.

Assuming that the magnetic layer on the tape is sufficiently thick, it has been determined that the number of magnetic particles which are activated so as to change the magnetic flux supplied to the reproducing head increases approximately in proportion to the square of the recording wavelength utilized. Further, the signal voltage generated at the reproducing head increases in proportion to the number of activated magnetic particles, while the noise voltage generated at the reproducing head increases in proportion to the square root of the number of activated magnetic particles. In other words, the signal voltage generated at the reproduced head increases in a proportional manner to the square of the wavelength and the noise voltage generated at the reproducing head increases in a proportional manner to the wavelength. Thus, if it assumed that the source of noise results only from the tape, that is, the activated magnetic particles thereon, the S/N ratio of the reproduced digitized signal increases in a proportional manner to the wavelength. Further, the S/N ratio for the amplifier system of the VTR is also proportional to the wavelength. It should therefore be appreciated that if the track width and the relative speed between the reproducing head and the tape are constant, the S/N ratio increases as the recording wavelength increases. However, it should be appreciated that this is contrary to the condition of high bit density recording where it is desirable to utilize a short wavelength in order to increase the line bit density L, and consequently, to thereby increase the recording bit density S.

In regard to the track density T, the signal voltage and tape noise voltage generated at the reproducing head each decrease in a proportional manner to reductions in the track width W. However, if the noise is generated only from the tape, the noise voltage generated at the reproducing head is only in proportion to the square root of the track width W. In such case, the S/N ratio of the reproduced digitized signal is proportional to the square root of the track width W.

In regard to the noise from the VTR, the inductance of the reproducing head is approximately proportional to the width of the reproducing head, that is, to the track width W. When the inductance of the reproducing head is constant, the number of turns of windings on the head are inversely proportional to the square root of track width W. Further, the magnetic flux linked with the windings of the head is proportional to the track width W. It should therefore be appreciated that, with the inductance of the reproducing head maintained at a constant value, the voltage induced in the reproducing head is proportional to the number of turns N times the magnetic flux $\phi_b$ intersecting the windings. In other words, the voltage E induced in the reproducing head is proportional to the square root of the track width W. Further, if the inductance of the reproducing head is constant, the noise generated by the reproducing head amplifier is also constant. Thus, assuming that the source of noise only results from the reproducing head amplifier, the S/N ratio of the reproduced digitized signal is proportional to the square root of the track width W. If the generated noise from the tape and from the reproducing head amplifier are independent of each other, the S/N ratio of the reproduced digitized signal, as a result of the combined noise from the tape and the reproducing head amplifier, is proportional to the square root of the track width W. In other words, reduction of the track width W so as to increase the track density T results in a deterioration of the S/N ratio.

It should be appreciated from the above that the recording bit density S is increased by reducing the track width W so as to increase the track density T and by utilizing a short recording wavelength so as to increase the line bit density L. However, such conditions result in a deterioration of the S/N ratio. It should therefore be appreciated that the conditions for increasing the S/N ratio while increasing the recording bit density S are contrary to one another.

In order to compensate for the above, previously proposed digital video tape recorders have recorded the video signal in a plurality of parallel tracks extending obliquely on a magnetic tape with guard bands between adjacent tracks, as shown in FIG. 1. This results in a reduction of cross-talk noise interference caused by leakage magnetic flux from adjacent tracks with a consequent increase in the S/N ratio. Of course, such cross-talk interference relates only to the noise generated by the tape and not from the reproducing head amplifier. However, in such case, if the track density T is increased, that is, the track width W is decreased, so as to increase the recording bit density S, the guard bands between adjacent tracks are also reduced. This results in increased cross-talk noise interference from adjacent tracks. Also, in such case, when the track width W becomes too narrow, tracing of the tracks by the reproducing heads becomes difficult so that incorrect tracing is apt to occur with a consequent deterioration of the S/N ratio.

Before proceeding further, the above-mentioned cross-talk interference from adjacent tracks will be discussed. Referring first to FIG. 1, there is shown a reproducing head 1 having a width W and a plurality of parallel recorded tracks 2 with guard bands between adjacent tracks. The width of the tracks is equal to the head width W and a magnetized width $\Delta W$ caused by fringe flux and which is equally divided on both sides of each track so that a fringe flux width $\Delta W/2$ extends in the widthwise direction on both sides of each track. Given that the width of each guard band is equal to x, the wavelength of the recorded signal is $\lambda$, the level of the desired or true recorded signal is E, and the level of the cross-talk signal is $E_c$, the cross-talk interference component $C_t$ can be expressed by the following equation:

$$C_t = 20 \log(E_c/E) = A + B \cdot x/\lambda \, dB \tag{2}$$

where $$A = 20 \log \left[ \frac{1}{K} \cdot \frac{\lambda}{b} e^{b\frac{\Delta W}{2\lambda}} \left( 1 - e^{-b\frac{W+\Delta W}{\lambda}} \right) e^{-b\frac{x}{\lambda}} \right] \tag{3}$$

$$K = W + \frac{2\lambda}{b} \left( 1 - e^{-b\frac{\Delta W}{2\lambda}} \right) . \tag{4}$$

Further, it is assumed that $x >> \Delta W$ and, by experiment, it has been determined that $\Delta W \simeq 0.67 \lambda$, $b \simeq 6.9$ and $B \simeq -60$.

Figure 2:
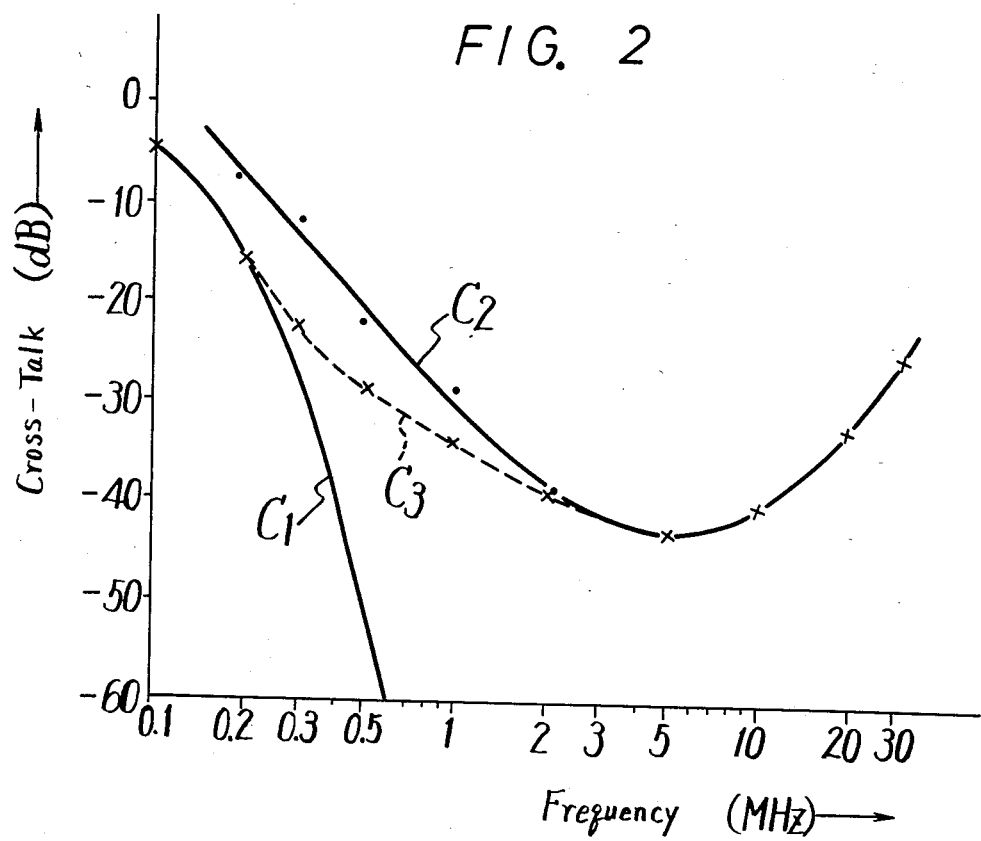
FIG. 2 is a graphical diagram illustrating the crosstalk characteristics of the previously proposed method of FIG. 1 and the method, according to this invention.

If values for the track width W and the guard band width x are chosen as 40 $\mu$m and 20 $\mu$m, respectively, from equation (2), when the relative speed of the reproducing head to the tape is 25.59 m/sec, the frequency characteristic for the theoretical cross-talk component is shown by curve C1 in FIG. 2. In other words, curve C1 represents the cross-talk interference resulting from the two end tracks in FIG. 1 when head 1 traces the center track of FIG. 1. It should be appreciated from this curve that the level of the cross-talk interference is substantially increased for low frequency components of the video signal.

It should further be appreciated that the reduction of guard band width x and, of track width W, necessarily results in the tracks being closer to one another so as to result in increased cross-talk interference. Therefore, there is a limit to the reduction of guard band width x in order to provide that a picture can be reproduced with good quality.

Further, as previously discussed, as the track width W is decreased, it becomes difficult to accurately trace each track. In other words, reproducing head 1 is apt to deviate from the desired path of the recording track. This, of course, results in a substantial increase in cross-talk interference from adjacent tracks. Although the tracking accuracy can be improved by various servo techniques, it is fundamentally determined by the mechanical accuracy of the system which cannot be accurately controlled. In this manner, it should be appreciated that because of mistracking and cross-talk interference from adjacent tracks, the track width W and guard band width x can only be reduced by a certain amount in order to increase the recording bit density S.

Referring now to FIGS. 2 and 3, the basis of the present invention will now be described, which is aimed at obtaining a high recording density while, at the same time, substantially increasing the S/N ratio. In accordance with the present invention, the digitized color video signal is distributed to a plurality of channels and the signals from the channels are recorded by recording heads associated with each of the respective channels in adjacent parallel tracks extending obliquely on a magnetic tape with the longitudinal edges of the adjacent tracks being in contact with each other so as to eliminate any guard bands therebetween. Further, the digitized signal is recorded so that the azimuth angles in adjacent tracks are different from one another, with the azimuth angle for each track being defined by the angle between the direction of the air gap of the recording head utilized and a reference direction, for example, the direction perpendicular to the longitudinal direction of the track. Preferably, the azimuth angles $\theta$ in adjacent tracks are equal, but opposite, as shown in FIG. 3A. During reproduction, reproducing heads with air gaps having the same direction as those of the respective recording heads trace the respective tracks to reproduce the digitized video signal therefrom. By utilizing such arrangement, cross-talk interference between adjacent tracks is substantially reduced as a result of azimuth loss. Such azimuth loss $L_a$, during reproduction, as a result of the recording of the video signal in adjacent tracks with different azimuth angles, can be expressed as follows:

$$L_a = 20 \log \left| \frac{\sin \frac{\pi W}{\lambda} \tan \theta}{\frac{\pi W}{\lambda} \tan \theta} \right| dB \quad (5)$$

where $\overline{\theta}$ represents the azimuth angle relative to a reproducing (or recording) head 1 and recording track 2. It should be appreciated from equation (5) that, if the relative speed of head 1 to the tape is constant, the azimuth loss $L_a$ increases with decreasing wavelength $\lambda$, that is, with increasing frequency. Thus, in accordance with another aspect of this invention, the digital video signal is code converted in order to reduce the low frequency spectrum components thereof so as to provide an increased azimuth loss $L_a$.

In particular, a specific example will now be illustrated for comparing the recording according to this invention with the previously discussed recording which provides guard bands between adjacent tracks. As shown in FIG. 3A, the digitized video signals from two channels are recorded in adjacent tracks 2 with a differential azimuth angle $\theta_d$ between the adjacent tracks which is selected as 14°, and the width W of each track is selected as 60 μm with no guard bands therebetween. When a reproducing head 1 (with a correct air gap angle) traces a respective one of tracks 2 of FIG. 3A, the cross-talk component from the adjacent track is shown by curve C2 in FIG. 2. In comparison, from measured values, when the track width W is selected as 40 μm, the width x of each guard band is selected as 20μ and the azimuth angle $\theta$ for all tracks is selected as 0°, as shown in FIG. 3B, and when reproducing head 1 scans one of tracks 2 in FIG. 3B, the actual cross-talk component from the adjacent track is represented by curve C3 in FIG. 2. The above curves C2 and C3 were obtained for the case where the relative speed of the reproducing head to the tape was equal to 25.59 m/sec.

From curve C2 according to this invention, for frequencies lower than approximately 2 MHz, the cross-talk component decreases with increasing frequencies up to approximately 2 MHz. When the frequency is higher than 2 MHz, the cross-talk interference between adjacent tracks increases with increasing frequency due to coupling between the heads and the like. In the actual curve C3 in which the recorded tracks have guard bands therebetween for frequencies lower than about 200 KHz, the cross-talk curve becomes coincident with the theoretical curve C1. Above 200 KHz, curve C3 follows a similar pattern to that of curve C2 in which the cross-talk interference from adjacent recorded tracks decreases with increasing frequencies up to about 2 MHz and thereafter, increases with increasing frequencies. Further, from a comparison of curves C2 and C3, it is seen that, for frequencies lower than about 1 MHz, the cross-talk component, in the case of azimuth recording according to this invention, is greater than the cross-talk component in the case of normal recording with guard bands, by only 4 to 6 dB. In the frequency range greater than 1 MHz, curves C2 and C3 are substantially coincident so that the cross-talk components are approximately equal.

It should be appreciated that the tape consumption is the same for normal recording with guard bands, shown in FIG. 3B, and azimuth recording without guard bands according to this invention, shown in FIG. 3A. Further, the cross-talk interference between adjacent tracks for the two recordings is substantially the same. However, as previously discussed, the S/N ratio of the reproduced digital signal is proportional to the square root of the track width W. Thus, as the track W is increased, the level of the reproduced signal, and consequently, the S/N ratio, also increases. It should therefore be appreciated that the overall S/N ratio for the recording according to this invention, as shown in FIG. 3A, is higher than that for the recording shown in FIG. 3B. In particular, the S/N ratio for the recording according to this invention is greater than that for the recording shown in FIG. 3B by an amount $$20 \log \sqrt{\frac{60}{40}} = 1.76 \text{ dB}.$$

Further, upon the occurrence of a tracking error by the reproducing head, it should be appreciated that the S/N ratio of the reproduced signal for the recording as shown in FIG. 3A is even higher than the aforementioned 1.76 dB over that for the recording shown in FIG. 3B. For example, when reproducing head 1 is displaced so as to trace two adjacent tracks by an equal amount, as shown in FIGS. 3A and 3B, any deterioration of the S/N ratio for the recording in FIG. 3A is substantially reduced as a result of azimuth loss. However, when reproducing from the recorded tracks shown in FIG. 3B by reproducing head 1 which equally overlaps the two tracks, the S/N ratio is 0 dB since the amount of cross-talk interference picked up from the non-desired track is equal to the level of the signal from the track desired to be traced. It should therefore be appreciated that the utilization of azimuth recording with no guard bands between adjacent tracks provides a greatly improved recording over that previously proposed. In other words, by utilizing an azimuth recording, there is obtained a high S/N ratio while also providing high bit density recording.

There is, however, a limit to the value of the azimuth angle $\theta$. In particular, the effective recording wavelength $\lambda_e$ can be expressed as follows:

$$\lambda_e = \lambda \cos \theta \qquad (6)$$

where $\lambda$ is the actual recording wavelength utilized. From equation (6), it should be appreciated that the effective recording density is lowered, and consequently, the recording is easily effected by spacing and gap loss when the effective recording wavelength $\lambda_e$ is small. Since the effective recording wavelength $\lambda_e$ decreases as the azimuth angle $\theta$ increases, the differential azimuth angle $\theta_d$ between adjacent tracks cannot be selected too large. It has been ascertained by experiment that the differential azimuth angle $\theta_d$ is preferably selected in the range of 10° to 30° in order to provide high density recording.

As previously discussed in regard to equation (5), the azimuth loss $L_a$ increases as the recording frequency increases. In like manner, when the recording frequency is low, the azimuth loss $L_a$ is also low. This is seen more particularly by curve C2 in FIG. 2 which illustrates an increase in the cross-talk interference with decreasing frequencies below approximately 2 MHz. It should be appreciated that the cross-talk interference between adjacent tracks is considered as a noise signal, in addition to other previously-mentioned noise components, which results in a deterioration of the S/N ratio of the reproduced digital signal. Since the S/N ratio for the reproduced digital signal must be greater than 20 dB, as previously discussed, the level of the cross-talk interference must be lower than approximately $-30$ dB. Thus, for example, in the case of azimuth recording shown by curve C2 in FIG. 2, the level of the cross-talk interference is lower than $-30$ dB when the recording frequency is in the range of approximately 1 MHz to 25 MHz. However, the digitized video signal converted from the analog video signal includes many components with frequencies less than 1 MHz. Thus, in accordance with another aspect of this invention, the occurrence of low frequency signal components of the digitized video signal is reduced so as to substantially reduce cross-talk interference which cannot satisfactorily be elixinated by means of azimuth loss.

In particular, the present invention utilizes a code conversion system in which the digitized video signal is code converted to eliminate or at least substantially reduce such low frequency components in the digitized signal. Various types of code conversion systems are known in the art. For example, if the original digitized signal is an NRZ (non-return-to-zero) signal (FIG. 4A), it may be code converted to, for example, a bi-phase code signal (FIG. 4B), a Miller code signal (FIG. 4C) or an $M^2$ or modified Miller code signal (FIG. 4D), the frequency spectra of such signals being shown in the graph of FIG. 5, respectively. In the graphical diagram of FIG. 5, $\tau$ represents the bit period, $f_s$ represents the transmitting frequency (that is, the recording bit rate), and $f_n$ represents the Nyquist frequency. It should be appreciated that when the digitized signal is converted from the analog signal, it is in parallel form. However, upon recording, the digitized signal is converted from parallel form to serial form and the transmitting frequency $f_s$ is the frequency of the serial digitized signal. It should further be appreciated from FIG. 5 that the above code conversion systems, that is, bi-phase, Miller and $M_2$, reduce the low frequency components of the digitized signal in comparison to the original NRZ digitized signal (FIG. 4A).

In accordance with another code conversion system, the digitized signal is code converted in an 8-to-10 code conversion process, that is, a digitized signal comprised of 8-bit words is converted to a digitized signal comprised of 10-bit words. The broken line in FIG. 6 represents the theoretical frequency distribution with such 8-to-10 conversion process and the solid line represents the actual frequency distribution thereof. Preferably, the block coding is such that $2^8$ codes whose DC levels are close to zero are selected from $2^{10}$ codes of 10-bit words and arranged to have one-to-one correspondence to the original 8-bit codes, as specifically disclosed in detail in U.S. Pat. Application Ser. No. 06/171,481, filed July 23, 1980, having a common assignee herewith. By means of this process, the DC level of the recorded signal is made as close to zero as possible, that is, "0" and "1" bits alternate with each other as much as possible. Thus, for example, if $f_s$ equals 38.4 MHz, as shown in FIG. 6, the lower cut-off frequency at which the frequency spectrum is evenly divided in half is approximately 1.3 MHz, and in the frequency range lower than this cut-off frequency the frequency spectrum falls sharply. In this manner, the occurrence of low frequency components of the digitized signal, that is, components having a frequency below 1.3 MHz which result in the level of cross-talk interference being above $-30$ dB (FIG. 2), is substantially reduced. Thus, the azimuth loss $L_a$ is substantially increased so as to more effectively reduce crosstalk interference from adjacent tracks. In this manner, high density recording is achieved while reproduced digital signals from the recorded tracks have a high S/N ratio.

There will now be described an apparatus according to this invention for performing the above-described method of recording a digitized video signal in a plurality of parallel tracks extending obliquely on the magnetic tape without guard bands between at least some of the adjacent tracks and with the digitized video signal in some of the parallel tracks being recorded with an azimuth angle which is different from the azimuth angle in other ones of the parallel tracks. However, in order to facilitate an better understanding of this aspect of the present invention, there will first be described the conditions for digital recording of, for example, an NTSC color video signal.

The NTSC system color video signal is desirably digitized with the following conditions being established:

1. Since one frame comprises 525 lines, the number of lines selected for a first (third) and a second (fourth) field are 262 and 263, respectively. In the first field, a vertical synchronizing pulse and a horizontal synchronizing pulse are in phase with each other, and the field in which they are out of phase is considered the second field.

2. The number of sampled picture elements in each horizontal period (H) varies with the sampling frequency ($f_s$) employed. Since the color sub-carrier frequency ($f_{sc}$) is 455/2 times the horizontal frequency ($f_H$), the numbers of sampled picture elements in one horizontal period are as shown in the below Table 1 in the case of $f_s = 3f_{sc}$ and in the case of $f_s = 4f_{sc}$.

TABLE 1

| $f_s$ | | Even line | Odd line |
| --- | --- | --- | --- |
| $3f_{sc}$ | Odd frame | 682 | 683 |
| | Even frame | 683 | 682 |
| $4f_{sc}$ | Odd frame | 910 | 910 |
| | Even frame | 910 | 910 |

Apparatus for performing the previously-described recording arrangement according to the present invention will hereinafter be described with reference to a recording section (FIG. 7) and a playback or reproducing section (FIG. 8) of a digital VTR which will now be described in greater detail. In the digital VTR, a digitized video signal is recorded by a rotary head assembly (FIG. 10) in parallel tracks extending obliquely on a magnetic tape 3 (FIG. 11). Since the transmitting bit rate of the digital video signal is high, as previously discussed, four rotary heads 1A, 1B, 1C and 1D (FIG. 9) are disposed in close proximity to each other, and the digitized video signal of one field is distributed through four channels to such heads and recorded on the magnetic tape in four parallel tracks.

Figure 7:
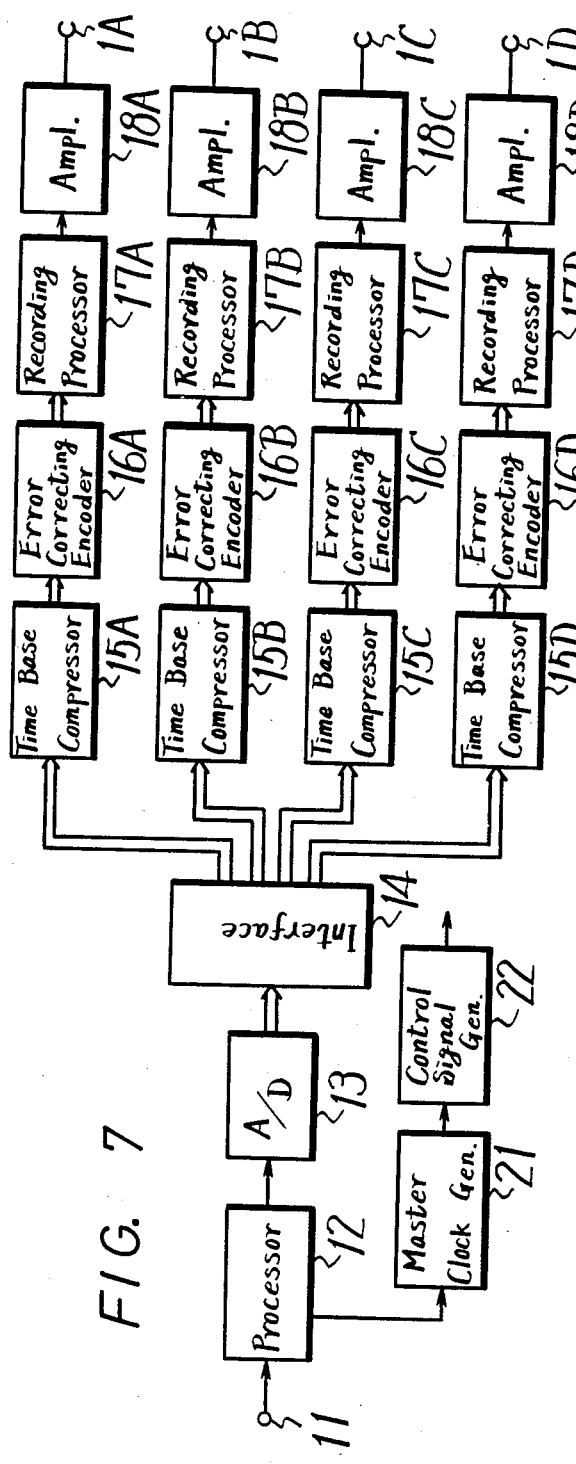
FIG. 7 is a block diagram illustrating a recording section of a digital video tape recorder (VTR) embodying this invention.

Referring in detail to FIG. 7, it will be seen that an NTSC color video signal to be recorded is applied through an input terminal 11 to an input processor 12. The input processor 12 comprises a clamp circuit and a synchronizing and burst signal separator and supplies the effective or video information portion of the color video signal to an A/D converter circuit 13. A synchronizing signal and a burst signal separated from the color video signal by processor 12 are applied to a master clock generator 21 which is desirably of PLL (phase-locked loop) construction. The master clock generator 21 generates clock pulses of the sampling frequency, for example, $4f_{sc}$ or 4 times the frequency of the burst signal. The clock pulses from generator 21 and the synchronizing signal are applied to a control signal generator 22 which produces various kinds of timing pulses, identifying signals (ID) for identifying lines, fields, frames and tracks, and a control signal, such as, a train of sampling pulses.

Figure 12:
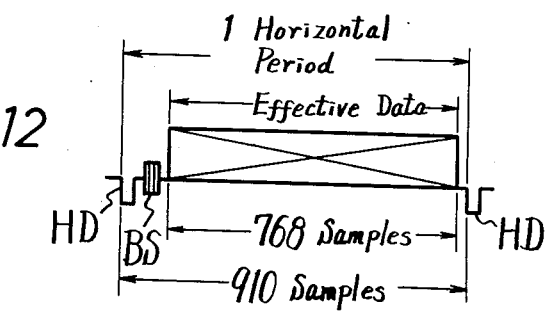
FIGS. 12, 13 and 14 are schematic diagrams to which reference will be made in explaining the digitization and code arrangement of a video signal for use in a digital VTR embodying this invention.

The A/D converter circuit 13 generally comprises a sample-and-hold circuit and an A/D converter for converting each sampled output to an 8-bit code which is supplied, in parallel form, to an interface 14. The duration or period of one line (1 H) of the NTSC color video signal is 63.5 μs and a blanking period therein is 11.1 μs. Accordingly, the period of the effective video region or portion is 52.4 μs. When the sampling frequency is $$4f_{sc} = \frac{4 \times 455}{2} f_H,$$

where $f_H$ is the horizontal frequency, the number of samples in one horizontal period is 910. Further, the number of samples in the effective video region or portion is 768 samples, as shown in FIG. 12. In consideration of the division of the video information to be recorded into four channels, the number of effective video samples is selected to be 768 per line or horizontal period with 192 samples being assigned to each channel. In FIG. 12, HD represents the horizontal synchronizing signal and BS represents the burst signal.

The number of lines forming one field is 262.5 H, with a vertical synchronizing period and an equalizing pulse period accounting for 10.5 H. Since test signals VIT and VIR are inserted in the vertical blanking period, they are also regarded as effective video signals. Thus, the number of effective video lines in one field period is selected to be 252. In other words, an effective frame is selected and may be arranged, for example, so that the first or odd field thereof includes video information in lines 12-263 and the second or even field thereof includes video information in lines 274-525. In this manner, each of the odd and even fields of each frame includes 252 field lines of video information.

The digitized effective video region of the color video signal is divided by interface 14 of the digital VTR into four channels. For example, with 768 samples per line, data corresponding to samples (4n+1) are assigned to channel A, data corresponding to samples (4n+2) are assigned to channel B, data corresponding to samples (4n+3) are assigned to channel C, and data corresponding to samples (4n+4) are assigned to channel D. The data of the four channels are processed in the same manner and only one channel will be described. The data in any one of the channels, for example, channel A, is derived as a record signal for head 1A after being applied, in sequence, to a time base compression circuit 15A, an error correcting or control encoder 16A, a recording processor 17A and a recording amplifier 18A. The recording amplifiers 18A, 18B, 18C and 18D are connected by way of a rotary transformer (not shown) to rotary heads 1A, 1B, 1C and 1D, respectively, disposed in close proximity to each other.

Figure 14:
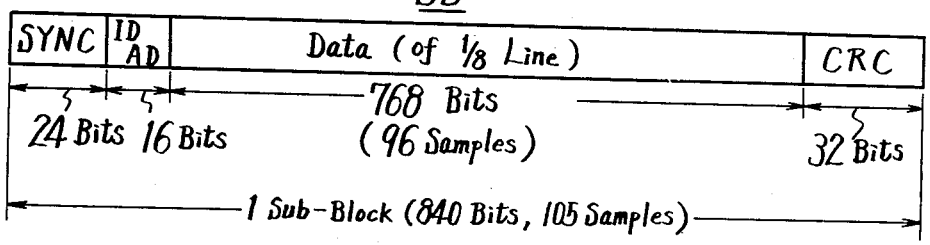

The code arrangement of each of the recorded signals respectively provided at heads 1A to 1D will now be described with reference to FIG. 14. As there shown, a sub-block SB of the coded digitized signal is composed of 105 samples (840 bits) in which a block synchronizing signal (SYNC) of three samples (24 bits), an identifying (ID) and address (AD) signal of two samples (16 bits), information data of 96 samples (768 bits) and CRC (Cyclic Redundancy Check) code of four samples (32 bits) are arranged one after another. The data of one line or horizontal period of the color video signal comprises 192 samples per channel, as previously mentioned, and these samples are divided into two sub-blocks, that is, there are two sub-blocks for each line of each channel, with 96 samples for each sub-block. In other words, each sub-block SB includes data for one-eighth of a line. The block synchronizing signal is used for identifying the beginning of a sub-block, whereupon the identifying and address signals, the information data and/or CRC code can be extracted. The identifying signals ID indicate the channel (track), the frame, the field and the line to which the information data of the sub-block belongs, and the address signal AD represents the address of the respective sub-block. The CRC code is used for the detection of an error in the information data of the respective sub-block.

Figure 13:
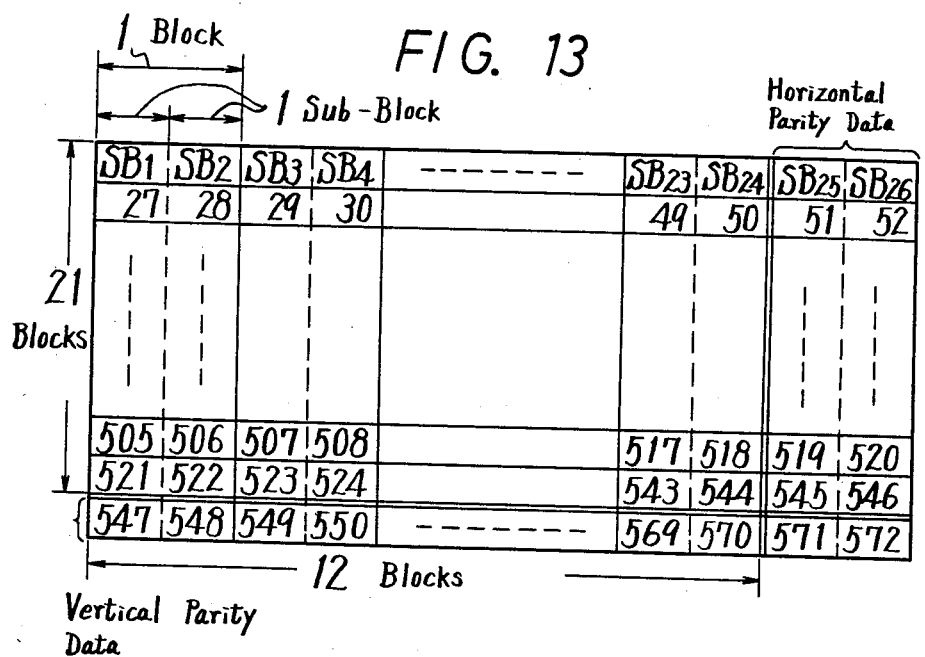

FIG. 13 shows the code arrangement for one field in one channel. In FIG. 13, each reference character SBi (i=1~572) indicates one sub-block, with two sub-blocks making up one block or line. Since the effective video region of one field is comprised of 252 lines, as mentioned previously, the data of 252 blocks (504 sub-blocks) exist in one field. The video information data of a particular field are sequentially arranged in a 21×12 matrix form. Parity data are also provided in connection with the horizontal and vertical directions, respectively, of the video information data in the matrix. More particularly, on FIG. 13, the parity data for the horizontal direction is shown positioned in the thirteenth column of blocks, and the parity data for the vertical direction is positioned in the twenty-second row at the bottom. In the thirteenth column of blocks at the twenty-second row is disposed the vertical parity data for the horizontal parity data. The parity data for the horizontal direction is formed in three ways by 12 sub-blocks respectively taken out of the 12 blocks forming one row of the matrix. In the first row, for example, parity data $SB_{25}$ is formed by the modulo 2 addition:

$$[SB_1] \oplus [SB_3] \oplus [SB_5] \oplus \ldots \oplus [SB_{23}] = [SB_{25}].$$

In the above, [SBi] means only the data in the respective sub-block SBi. In this case, samples belonging to respective ones of the 12 sub-blocks are each calculated in a parallel, 8-bit form. Similarly, by the modulo 2 addition:

$$[SB_2] \oplus [SB_4] \oplus [SB_6] \oplus \ldots \oplus [SB_{24}] = [SB_{26}]$$

parity data $[SB_{26}]$ is formed. The parity data is similarly formed for each of the second to twenty-first rows in the horizontal direction. Enhancement of the error correcting ability results from the fact that parity data is not formed merely by the data of the 24 sub-blocks included in a row, but is formed by the data of 12 sub-blocks positioned at intervals of two sub-blocks in the row.

The parity data for the vertical direction is formed by the data of 21 sub-blocks in each of the first to thirteen columns of blocks. In the first column, parity data $[SB_{547}]$ is formed by the modulo 2 addition:

$$[SB_1] \oplus [SB_{27}] \oplus [SB_{53}] \oplus \ldots [SB_{521}] = [SB_{547}].$$

In this case, samples belonging to each one of the 21 subblocks are calculated in a parallel 8-bit form.

Accordingly, these parity data comprise 105 samples as is also the case with the video data sub-blocks. In the case of transmitting the digitized signal of one field of the above matrix arrangement (22×13) as a series of first, second, third, ... twenty-second rows in sequence, since 13 blocks correspond to the length of 12 H, a period of 12×22=264 H is needed for transmitting the digital signal of one field. In other words, since the number of samples in each sub-block SB is 105 and the number of sub-blocks per field in each channel is 572, the number of samples per channel for each field is 105×572=60,060 samples. Further, since there are 4 channels and 910 samples per line, the number of horizontal periods needed for transmitting the video signal of one field is (60,060×4)/910=264 H.

Incidentally, if the VTR is of the C-format type, and thus employs an auxiliary head for recording and reproducing one part of the vertical blanking period in one field, then a duration of only about 250 H can be recorded with a video head. In accordance with the present invention, a duration of 246 H, leaving a margin of several H's, has to be recorded in each track, that is, the period of 264 H of data to be transmitted is time-base-compressed (with a compression ratio Rt of 41/44) to a period a duration of 246 H. Further, a pre-amble signal and post-amble signal, each having the transmitting bit frequency, are inserted at the beginning and the terminating end of the record signal of one field having the period of 264 H.

The time base compression circuit 15 in FIG. 1 compresses the video data with the above-noted compression ratio 41/44 and provides a data blanking period in which the block synchronizing signal, the identifying and address signals and the CRC code are inserted for each sub-block of video data of 96 samples, and at the same time, sets up data blanking periods in which the blocks of the parity data are inserted. The parity data for the horizontal and vertical directions and the CRC code of each sub-block are generated by the error control encoder 16. The block synchronizing signal (SYNC) and the identifying (ID) and address (AD) signals are added to the video data in the recording processor 17. The address signal AD represents the previously-noted number (i) of the sub-block. Further, in the recording processor 17 there is provided an encoder of the block coding type which converts the number of bits of one sample from 8 to 10, and a parallel-to-serial converter for serializing the parallel 10-bit code. As disclosed in detail in the aforementioned U.S. patent application Ser. No. 06/171,481, filed July 23, 1980 and having a common assignee herewith, the block coding is such that $2^8$ codes whose DC levels are close to zero are selected from $2^{10}$ codes of 10-bit words and arranged to have one-to-one correspondence to the original 8-bit codes. By means of the foregoing, the DC level of the recorded signal is made as close to zero as possible, that is, "0" and "1" alternate with each other as much as possible. Such block coding is employed for preventing degradation of the transmitting waveform on the playback side by substantial DC free transmission. It may also be possible to achieve the same results by employing a scramble system utilizing the so-called M-sequence which is substantially random in place of the block coding. It should be appreciated that by means of such code conversion, the low frequency signal components of the digital video signal are substantially reduced so that, for example, only signal components with frequencies higher than approximately 1.3 MHz are produced, as previously described in regard to FIG. 6. The recording processor 17 converts the code converted digital signal from parallel to serial form and then transmits the sub-blocks sequentially to the respective heads. In the case where each sample comprises 8 bits, the transmitting bit rate per channel, after converting the above 8-bit code to the 10-bit code, is as follows:

$$4f_{sc}) \times 8 \times \tfrac{1}{4} \times 44/41 \times 10/8 = 38.4 \text{ Mb/sec.}$$

This, of course, is the previously-described frequency $f_s$ in FIG. 6.

Figure 9:
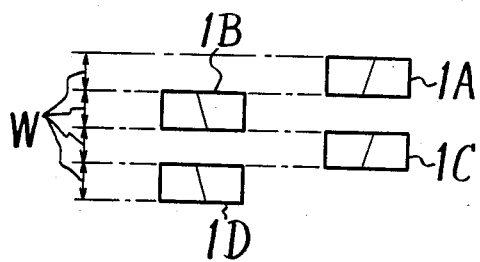
FIG. 9 is a schematic diagram illustrating the positional and azimuth angle relationship between the four magnetic heads of the recording and reproducing sections of FIGS. 7 and 8.
Figure 10:
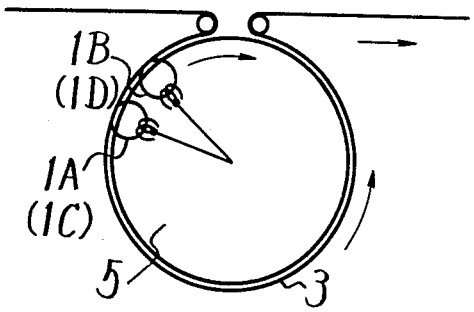
FIG. 10 is a schematic diagram of a rotary head assembly included in the digital VTR of FIGS. 7 and 8.
Figure 11:
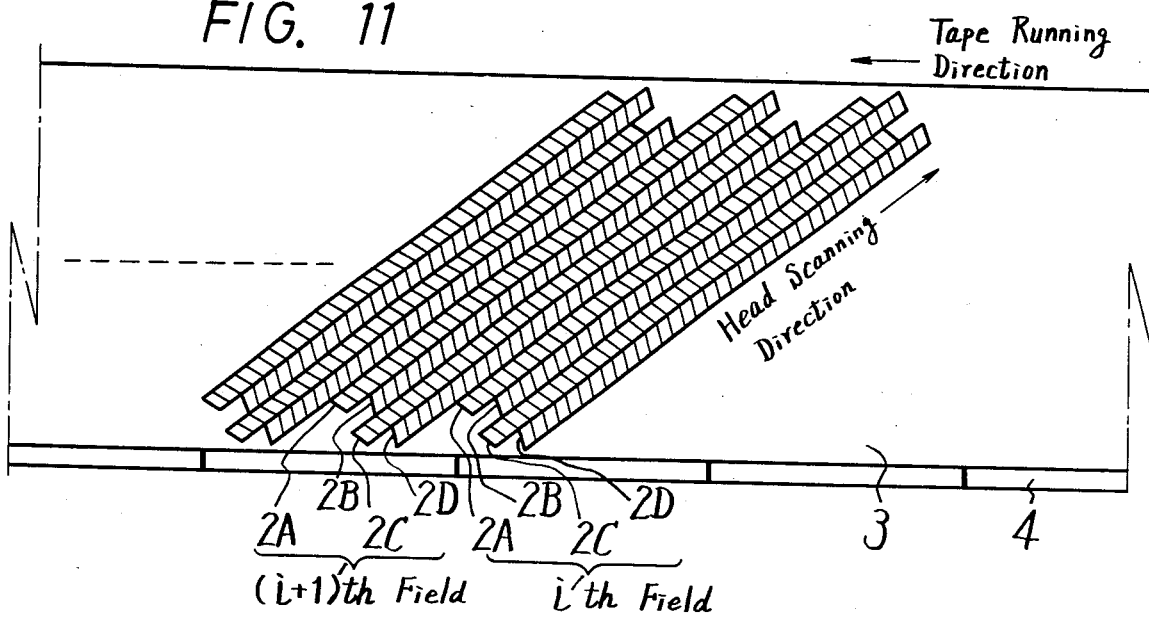
FIG. 11 is a schematic plan view of a section of magnetic tape showing tracks in which the signals are recorded by the recording section of FIG. 7 and showing the relationship between the azimuth angles in adjacent tracks.

The serially arranged digital signals in each channel are respectively supplied through a recording amplifier 18 to respective rotary magnetic heads 1A to 1D, which are arranged as shown in FIGS. 9 and 10. In particular, each of heads 1A to 1D has a height selected equal to the track width W. Further, heads 1A and 1C are mounted on a rotary drum 5 and aligned in the vertical direction with a distance W therebetween, and the other heads 1B and 1D are also mounted on rotary drum 5 and aligned in the vertical direction with a distance W therebetween. Heads 1A to 1D are arranged in close proximity to one another so that, for example, head 1B (1C) is positioned in the vertical direction between heads 1A (1B) and 1C (1D). Further, heads 1A and 1C are selected to have the same azimuth angle $\theta/2$, for example, 7° in one direction, and heads 1B and 1D are selected to have the same azimuth angle $\theta/2$, for example, 7° in the direction opposite to that of heads 1A and 1C. In this manner, the differential azimuth angle $\theta_d$ between adjacent tracks is 14°.

Heads 1A to 1D are rotated together with rotary drum 5 in synchronism with the color video signal at the feild frequency, and a magnetic tape 3 contacts the peripheral surfaces of heads 1A to 1D and rotary drum 5 over an angular range of abut 360° in a slant omega ($\Omega$) configuration, and the tape is driven at a constant speed. Accordingly, as shown in FIG. 11, the digitized signals from channels A to D are respectively recorded on tape 3 by heads 1A to 1D in tracks 2A to 2D, respectively, each track corresponding to one field. A control track 4 is also formed at the lower longitudinal edge of tape 3. In this case, the distance W between respective ones of the heads 1A to 1D is equal to the track width W, so that adjacent tracks 2A to 2D contact each other at the longitudinal edges thereof without any guard bands therebetween. Further, if the rotary radius of each of heads 1A to 1D and the speed of tape 3 are suitably selected, track 2A of each field may contact track 2D of the following field at the respective longitudinal edges thereof, as shown in FIG. 11. Further, since the azimuth angles of the heads are alternately opposed to one another, the azimuth angles of tracks 2A to 2D are also alternately opposed to each other so as to minimize cross-talk interference between adjacent tracks.

Figure 8:
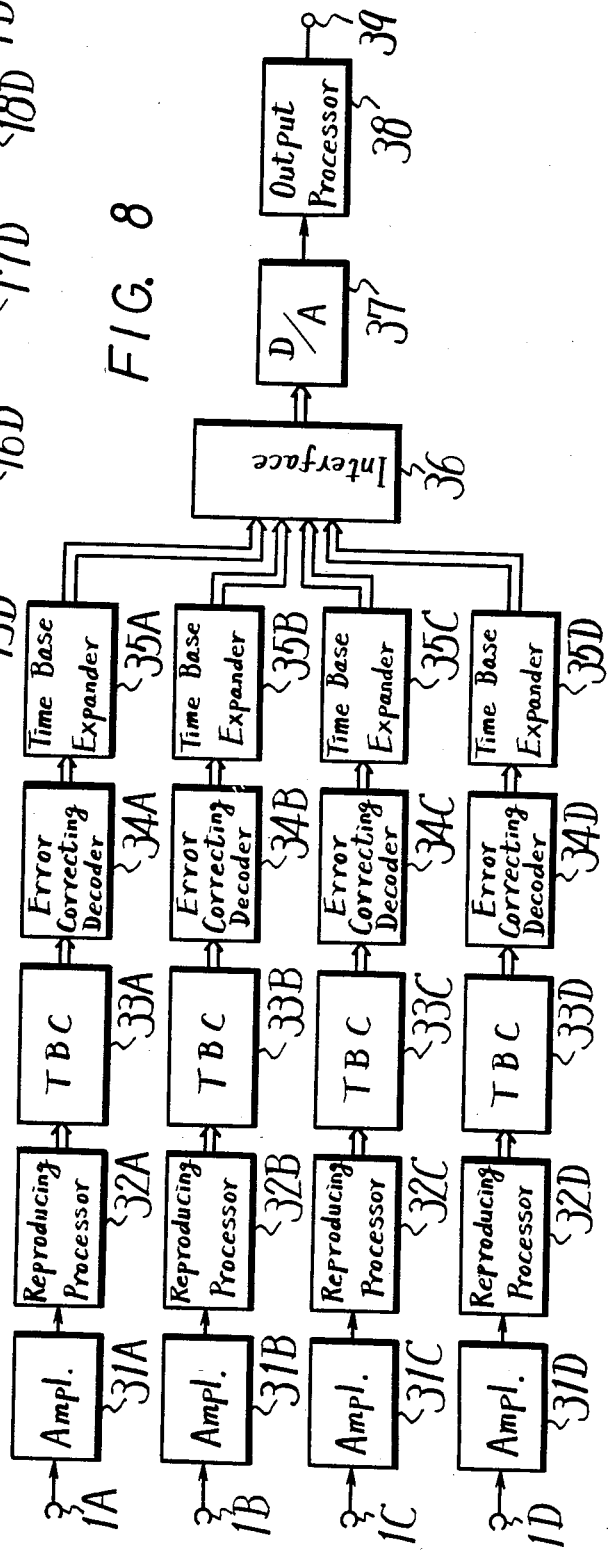
FIG. 8 is a block diagram illustrating a reproducing section of a digital video tape recorder (VTR) which is complementary to the recording section of FIG. 7.

In the reproducing or playback portion of the digital VTR, as shown in FIG. 8, the four channels of reproduced signals are derived from reproducing heads 1A to 1D which scan tracks 2A to 2D, respectively, corresponding thereto, and are applied through playback amplifiers 31A to 31D to respective waveform shaping circuits (not shown). Each of the waveform shaping circuits includes a playback equalizer for increasing the high-frequency component of the reproduced signal and shapes the reproduced signal to a clear pulse signal. Further, each waveform shaping circuit extracts a reproducing bit clock synchronized with the pre-amble signal and supplies the reproducing bit clock to respective playback processors 32A to 32D together with the data. In each of playback processors 32A to 32D, the serial data is converted to parallel form, the block synchronizing signal is extracted, the data is separated from the block synchronizing signal and from the ID, AD and CRC codes or signals, and further, block decoding or 10-bit to 8-bit conversion is performed. The resulting data is applied to time base correctors 33A to 33D, respectively, in which time base errors (or axis fluctuations) are removed from the data. Each of time base correctors 33A to 33D is provided with, for example, four memories, in which reproduced data are sequentially written by clock pulses synchronized with the reproduced data, and the data are sequentially read out from the memories, by reference clock pulses. When the reading operation is likely to get ahead of the writing operation, the memory from which the data has just been read is read again.

The data of each channel is provided from the respective ones of the time base correctors 33A to 33D to respective error correcting decoders 34A to 34D. Each error correcting decoder 34A to 34D includes error detecting and correcting circuits using CRC, horizontal and vertical parities, a field memory and so on. In particular, each error correcting decoder includes a field memory, and data is written into each field memory at every sub-block SB in response to, for example, the respective address signal AD thereof. At this time, any error in the data is corrected for every sub-block SB of information by the CRC code and horizontal and vertical parity data. If the error is too great to be corrected by the CRC code and parity data, the writing in of data of that sub-block SB in the field memory is not performed, and instead, data from the previous field is read out again.

The data from error correcting decoders 34A to 34D is supplied to respective time base expander circuits 35A to 35D, which returns the data to the original transmitting rate and then applies the data to a common interface 36. The interface 36 serves to return the reproduced data of the four channels into a single channel which includes a D/A converter circuit 37 for conversion of the data into analog form.

The output from D/A converter circuit 37 is applied to an output processor 38, from which a reproduced color video signal is provided at an output terminal 39. An external reference signal may be supplied to a master clock generator (not shown), from which clock pulses and a reference synchronizing signal are provided to a control signal generator (not shown). The control signal generator provides control signals synchronized with the external reference signal, such as, various timing pulses, identifying signals for the line, field and frame, and sample clock pulses. In the reproducing section, the processing of the signals from heads 1A to 1D to the input sides of time base correctors 33A to 33D is timed by the clock pulse extracted from the reproduced data, whereas the processing of the signals from the output sides of the time base correctors 33A to 33D to the output terminal 39 is timed by the clock pulse from the master clock generator. The above recording and reproducing sections shown in FIGS. 7 and 8 are disclosed more particularly in U.S. Pat. No. 4,329,708, issued May 11, 1982, having a common assignee herewith and the disclosure of which is incorporated herein by reference.

It should be appreciated that the method and apparatus for recording a video signal according to this invention, as described above, provides that a digitized video signal is recorded in parallel tracks with a high recording density in such a manner so as to reduce the tape consumption, resulting in longer periods of recording being possible with a given length of magnetic tape. Further, because the digitized video signal is recorded in parallel tracks without guard bands between adjacent tracks, the tracks are wider so as to increase the S/N ratio. Further, since more information can be recorded on the wider tracks, the recording density on the tape can be increased. In addition, because of the more efficient utilization of tape by providing wider tracks, there exists a larger tolerance for any tracking error during the reproduction operation. Since a multi-head apparatus is provided, it also may be possible during the reproduction operation to detect and correct any tracking error by means of the phase difference between the outputs from, for example, heads 1A and 1B. It should be appreciated that although the present invention has been described in the normal mode of operation, other special reproducing modes may be utilized with this invention, for example, a search mode, in which the heads scan the tracks when the relative speed between the heads and the tracks is greater than that for normal recording. Thus, by identifying the channel with the identifying signal ID, reproduction during such search mode can be carried out even when, for example, head 1A, scans track 2C.

Figure 15:
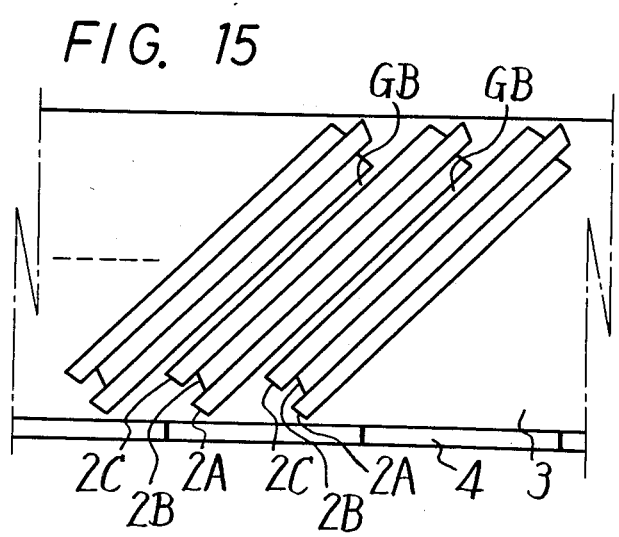
FIG. 15 is a schematic plan view of a section of magnetic tape illustrating the relationship between adjacent tracks in accordance with another embodiment of this invention.

Although one embodiment of the present invention has been described above, it should be appreciated that other embodiments within the scope of this invention can be provided. For example, although the digitized video signal was divided into four channels and the signal of one field of video information was recorded in four tracks 2A to 2D, the digitized video signal may be divided into an odd number of channels, for example, three channels. In such case, three recording (reproducing) heads are provided, each associated with one of the channels, so that the three heads simultaneously scan tracks 2A to 2C, respectively, to record one field of video information, as shown in FIG. 15. In such case, a guard band GB is formed after every three sequential tracks 2A to 2C so as to separate each field of video information on tape 3. However, it should be appreciated that the azimuth angles in adjacent tracks without guard bands GB therebetween are different. For example, it may be sufficient for each center track 2B to have the digitized video signal recorded therein with a first azimuth angle and the remaining two tracks 2A and 2C having a digitized video signal recorded therein with a second azimuth angle which is different from the first azimuth angle.

Further, although it is preferable that the low frequency signal components of the digitized video signal be attenuated by the aforementioned 8-to-10 conversion system, it may be the case that the cross-talk interference between tracks at the outputs of reproducing amplifiers 31A to 31D is smaller than a predetermined value. In such case, an NRZ recording partial response detecting system, which will attenuate low frequency signal components in the reproducing section, may be sufficient to provide a satisfactory S/N ratio.

Further, it should be appreciated that although a magnetic tape 3 has been utilized in the preferred embodiment of this invention, it may be possible to use a magnetic disc, magnetic drum or the like.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for recording a video signal on a magnetic tape comprising:
    means for converting the video signal into digital form;
    means for distributing respective portions of the digitized video signal to at least two channels, each of said at least two channels including code converting means for code converting the respective portions of said digitized video signal distributed to the respective channel so as to reduce low frequency components of said digitized video signal; and
    means for recording the respective portions of said digitized video signal in a plurality of parallel tracks extending obliquely on said magnetic tape without guard bands between at least some adjacent ones of the parallel tracks and with said portions of the digitized video signal in adjacent ones of the parallel tracks without guard bands therebetween being recorded with different azimuth angles.

2. Apparatus according to claim 1; in which said video signal is a color video signal and said means for converting includes means for sampling said color video signal at a frequency which is at least three times the color sub-carrier frequency of the color video signal and analog-to-digital converting means for converting the sampled color video signal into digitized form.

3. Apparatus according to claim 2; in which said means for distributing includes interface means for distributing digitized samples of the digitized color video signal from said analog-to-digital converting means sequentially to said at least two channels.

4. Apparatus according to claim 1; in which each of said channels includes time base compression means supplied with respective portions of said digitized video signal from said means for distributing for compressing said respective portions supplied thereto; error control encoding means supplied with said respective portions from said time base compression means for generating error control data from said respective portions supplied thereto and for adding said error control data to the digitized video signal comprised of said respective portions; and recording processor means for adding synchronizing, identifying and address signals to said digitized video signal comprised of said respective portions from said erorr control encoding means; and said means for recording includes transducer means associated with each channel for recording the output from the respective recording processor means for each channel in one of said plurality of parallel tracks.

5. Apparatus according to claim 4; including four channels and in which said means for recording includes four transducers, each associated with a respective one of said four channels for recording the output from the recording processor means of the respective channel in one of said plurality of parallel tracks, with the digitized video signal in alternate ones of said parallel tracks being recorded with an azimuth angle which is different from the azimuth angle in the remaining alternate ones of the parallel tracks and without any guard bands between any adjacent ones of said parallel tracks.

6. Apparatus according to claim 5; further including a rotary drum assembly adapted for rotatable movement, and in which said four transducers are secured to said rotary drum assembly and adapted to rotate therewith, a first set of two of said transducers having an air gap with a first azimuth angle and separated by the width of one of said parallel tracks in the vertical direction of said guide drum assembly, and a second set of the other two of said transducers having an air gap with a second azimuth angle different from said first azimuth angle and separated by the width of one of said parallel tracks in the vertical direction of said guide drum assembly, with the vertical position of one of said transducers of said first set corresponding to a position between said two transducers of said second set and with the vertical position of one of said transducers of said second set corresponding to a position between said two transducers of said first set.

7. Apparatus according to claim 1; in which said digitized video signal is comprised of a plurality of 8-bit words and each of said code converting means converts each of said 8-bit words to a respective 10-bit word from a 10-bit word code.

8. Apparatus according to claim 1; in which each of said code converting means substantially eliminates components of said digitized video signal with frequencies lower than approximately 1 MHz.

9. A method of recording a video signal on a magnetic tape comprising the steps of:
    converting the video signal into digital form;

distributing respective portions of the digitized video signal to at least two channels;

code converting the respective portions of said digitized video signal distributed to each channel so as to reduce low frequency components of said digitized video signal; and recording the respective portions of said digitized video signal in a plurality of parallel tracks extending obliquely on said magnetic tape without guard bands between at least some adjacent ones of the parallel tracks and with said portions of the digitized video signal in adjacent ones of the parallel tracks without guard bands therebetween being recorded with different azimuth angles.

10. The method according to claim 9; in which said video signal is a color video signal and further including the step of sampling said color video signal at a frequency which is at least three times the color sub-carrier frequency of the color video signal, and said step of converting includes the step of converting the sampled video signal into digital form.

11. The method according to claim 10; further including the steps of compressing said respective portions of said digitized video signal distributed to each of said at least two channels; generating error control data from said respective compressed portions in each channel; adding said error control data to the respective compressed portions in each channel; and adding synchronizing, identifying and address signals to said respective compressed portions with said error control data in each channel, prior to said step of recording.

12. The method according to claim 9; in which said step of recording includes the step of recording the respective portions of said digitized video signal in said plurality of parallel tracks without guard bands between any adjacent ones of said parallel tracks and with the digitized video signal in alternate ones of said parallel tracks being recorded with a first azimuth angle and the digitized video signal in the remaining alternate ones of said parallel tracks being recorded with a second azimuth angle which is different from said first azimuth angle.

13. The method according to claim 12; in which said step of distributing distributes the respective portions of the digitized video signal to four channels and four sequential ones of said parallel tracks include a field interval of video information.

14. The method according to claim 9; in which said video signal is comprised of a plurality of 8-bit words and said step of code converting includes the step of converting each of said 8-bit words to a respective 10-bit word from a 10-bit word code.

15. The method according to claim 9; in which said step of code converting substantially eliminates components of said digitized video signal with frequencies lower than approximately 1 MHz.

16. A method of recording a video signal on a magnetic tape comprising the steps of:

converting the video signal into digital form;

distributing respective portions of the digitized video signal to at least three channels, three sequential ones of said parallel tracks including a field interval of video information; and recording the respective portions of said digitized video signal in a plurality of parallel tracks extending obliquely on said magnetic tape with a guard band provided after every three sequential ones of said parallel tracks and without any guard bands between adjacent ones of the remaining tracks, and with the digitized video signal in the center track of every three sequential ones of said parallel tracks corresponding to a field interval and being recorded with an azimuth angle which is different from the azimuth angle in the remaining ones of the parallel tracks.

* * * * *